(12) United States Patent
Gulnick

(10) Patent No.: US 9,976,311 B2
(45) Date of Patent: May 22, 2018

(54) ATTACHMENT BRACKETS FOR PANEL MOUNTING

(71) Applicant: James Reid Gulnick, Voorhees, NJ (US)

(72) Inventor: James Reid Gulnick, Voorhees, NJ (US)

(*) Notice: Subject to any disclaimer, the term of this patent is extended or adjusted under 35 U.S.C. 154(b) by 0 days. days.

(21) Appl. No.: 15/475,480

(22) Filed: Mar. 31, 2017

(65) Prior Publication Data
US 2017/0204615 A1 Jul. 20, 2017

Related U.S. Application Data

(63) Continuation-in-part of application No. 14/953,958, filed on Nov. 30, 2015, now Pat. No. 9,650,789.

(60) Provisional application No. 62/114,315, filed on Feb. 10, 2015.

(51) Int. Cl.
| | |
|---|---|
| *E04F 13/08* | (2006.01) |
| *E04F 13/14* | (2006.01) |
| *F16M 13/02* | (2006.01) |
| *A47F 5/08* | (2006.01) |
| *F16B 5/07* | (2006.01) |
| *F16B 5/06* | (2006.01) |

(52) U.S. Cl.
CPC .......... *E04F 13/083* (2013.01); *E04F 13/081* (2013.01); *E04F 13/0803* (2013.01); *E04F 13/145* (2013.01); *F16M 13/02* (2013.01); *A47F 5/0846* (2013.01); *A47F 5/0853* (2013.01); *A47F 5/0861* (2013.01); *E04F 13/0801* (2013.01); *E04F 13/0805* (2013.01); *E04F 13/0816* (2013.01); *E04F 13/0864* (2013.01); *F16B 5/0657* (2013.01); *F16B 5/07* (2013.01)

(58) Field of Classification Search
CPC ... E04F 13/0803; E04F 13/083; E04F 13/081; E04F 13/0816; E04F 13/0864; E04F 13/0826; E04F 13/0801; E04F 13/0805; F16M 13/02; F16B 5/07
USPC ..... 248/220.21, 220.22, 475.1, 489; 52/36.5, 52/235, 489.1, 506.05, 506.06, 511
See application file for complete search history.

(56) References Cited

U.S. PATENT DOCUMENTS

| | | | | |
|---|---|---|---|---|
| 1,908,200 A | * | 5/1933 | Webster | A47G 1/1686 248/495 |
| 2,974,918 A | * | 3/1961 | Voigtlander | A47B 57/46 248/201 |
| 3,310,271 A | * | 3/1967 | King | A47F 5/0815 248/220.43 |
| 3,532,317 A | * | 10/1970 | Adler | G09F 7/08 248/222.12 |

(Continued)

*Primary Examiner* — Stanton L Krycinski
*Assistant Examiner* — Taylor L Morris
(74) *Attorney, Agent, or Firm* — Dunlap Bennett & Ludwig PLLC

(57) ABSTRACT

A wall mounting system is provided. The wall mounting system includes a plurality of mount brackets. A pair of hooks extend along the length of the mount brackets and are substantially parallel to one another. Each the pair of hooks includes a horizontal portion and a vertical portion. The horizontal portion includes a proximal end and a distal end. The proximal end extends from the front surface and includes a notch formed on an upper surface. The vertical portion extends from the distal end of the horizontal portion. The hooks of a mounting bracket interlock with the hooks of another mounting bracket.

13 Claims, 6 Drawing Sheets

(56) References Cited

U.S. PATENT DOCUMENTS

| | | | | |
|---|---|---|---|---|
| 3,672,622 A * | 6/1972 | Breslow | F16B 12/56 | 248/223.41 |
| 4,669,238 A * | 6/1987 | Kellis | E04F 13/0832 | 52/105 |
| 4,736,918 A * | 4/1988 | Bessinger | A47B 96/065 | 108/152 |
| 4,804,161 A * | 2/1989 | Wallo | A47G 1/164 | 248/489 |
| 5,208,952 A * | 5/1993 | Mintel | A43C 11/00 | 24/584.1 |
| 5,556,068 A * | 9/1996 | Gorelik | A47F 5/0823 | 248/214 |
| 5,791,093 A * | 8/1998 | Diamond | A47F 5/0846 | 52/36.5 |
| 5,941,026 A * | 8/1999 | Eisenreich | A47F 5/0846 | 211/103 |
| 5,961,090 A * | 10/1999 | Parkin | A47G 1/1606 | 248/475.1 |
| 6,113,201 A * | 9/2000 | Bauer | A47B 95/008 | 312/245 |
| 6,164,467 A * | 12/2000 | DePottey | A47F 5/0846 | 211/189 |
| 6,226,947 B1 * | 5/2001 | Bado | E04F 13/0805 | 52/235 |
| 6,286,802 B1 * | 9/2001 | Munson | A47G 1/1606 | 248/475.1 |
| RE41,140 E * | 2/2010 | Heath | E04B 5/026 | 52/177 |
| 7,748,182 B2 * | 7/2010 | McGee | E04B 2/7457 | 52/235 |
| 8,104,726 B2 * | 1/2012 | Hoernig | A47K 17/022 | 248/220.22 |
| 8,359,811 B2 * | 1/2013 | Muller | E04F 13/144 | 52/477 |
| 8,573,415 B2 * | 11/2013 | Ernst | A47B 96/067 | 211/183 |
| 2002/0166939 A1 * | 11/2002 | Plein, II | G06F 3/0395 | 248/346.01 |
| 2003/0038222 A1 * | 2/2003 | Holmes | A47G 1/1606 | 248/475.1 |
| 2005/0006554 A1 * | 1/2005 | DeLine | A47G 1/1606 | 248/475.1 |
| 2005/0072894 A1 * | 4/2005 | Grant | A47B 95/008 | 248/475.1 |
| 2005/0279901 A1 * | 12/2005 | McCoy | E04B 2/82 | 248/300 |
| 2009/0050775 A1 * | 2/2009 | Constantinou | A47G 1/1606 | 248/489 |
| 2009/0313935 A1 * | 12/2009 | Montgomery | E04F 13/081 | 52/506.1 |
| 2010/0219144 A1 * | 9/2010 | Salmon | A47B 96/067 | 211/94.01 |
| 2011/0260129 A1 * | 10/2011 | Schopf | E04F 11/1851 | 256/24 |
| 2012/0151861 A1 * | 6/2012 | Mulhair | E04F 13/083 | 52/506.05 |
| 2012/0186170 A1 * | 7/2012 | Macdonald | E04F 13/0805 | 52/173.3 |
| 2013/0048812 A1 * | 2/2013 | Lozano | H05K 5/0204 | 248/220.22 |
| 2013/0111840 A1 * | 5/2013 | Bordener | E04B 1/68 | 52/393 |
| 2014/0054435 A1 * | 2/2014 | Chatterjea | A47G 1/06 | 248/475.1 |
| 2014/0290166 A1 * | 10/2014 | Bordener | E04F 13/0803 | 52/474 |
| 2016/0106214 A1 * | 4/2016 | Hagen | H05K 5/0204 | 361/679.21 |

* cited by examiner

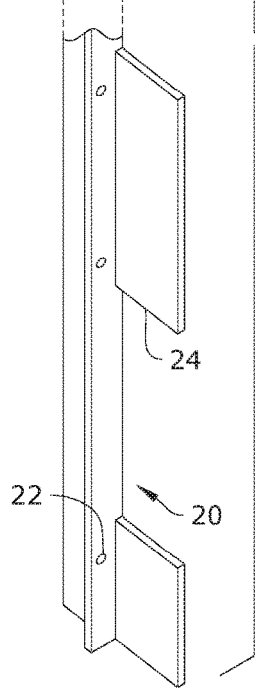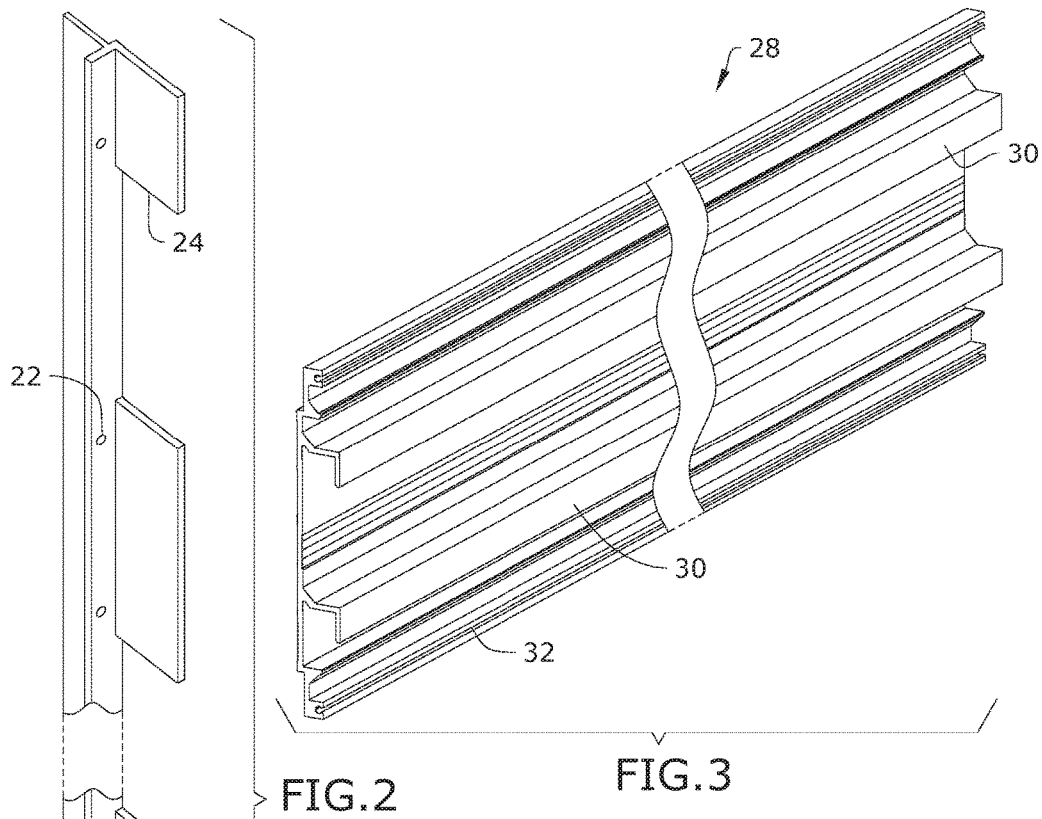

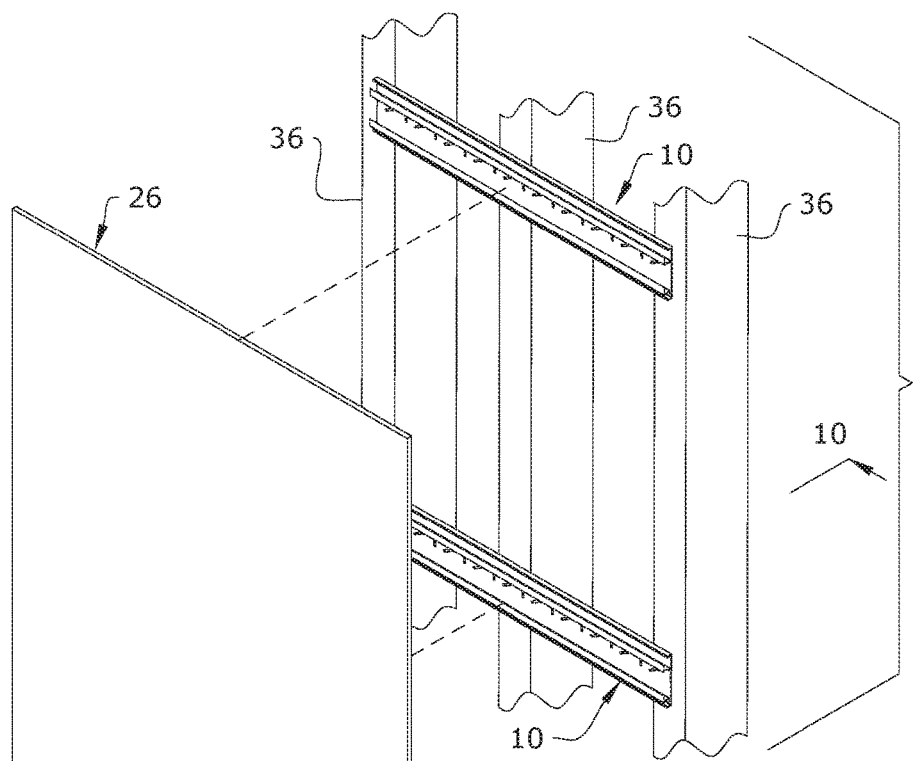
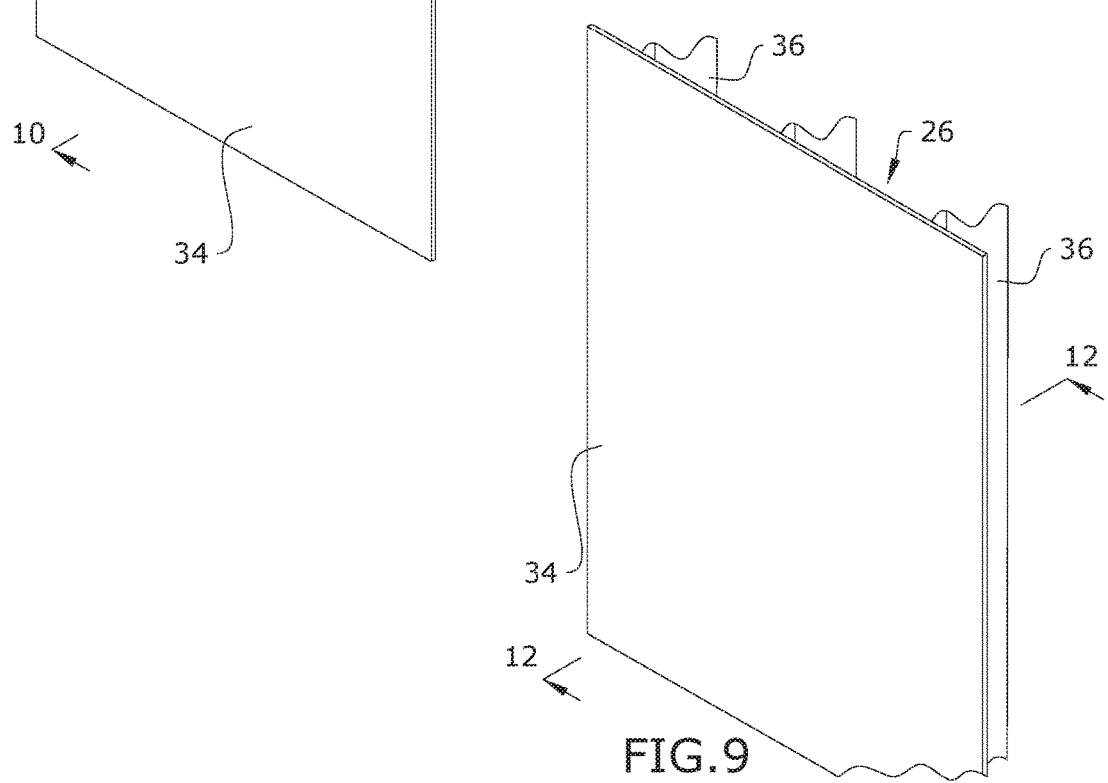

ATTACHMENT BRACKETS FOR PANEL MOUNTING

CROSS-REFERENCE TO RELATED APPLICATION

This application is a continuation-in-part of U.S. non-provisional application Ser. No. 14/953,958, filed Nov. 30, 2015 which claims the benefit of U.S. provisional application No. 62/114,315, filed Feb. 10, 2015, the contents of which are herein incorporated by reference.

BACKGROUND OF THE INVENTION

The present invention relates to vertically mounting panels to walls and, more particularly, to attachment brackets for vertically mounting panels to walls.

Currently, it is difficult mounting, aligning, and securing glass on vertical walls in a safe, fast, and affordable manner. Current systems require attachment points to be located on the back of glass panels and on walls with metal contacting glass and many attachment points requiring perfect alignment to be effective. Clips may be attached to the glass and wall and require lifting and lowering. The final position of the glass is not adjustable. If the positioning is physically off, then the glass must be removed, the multiple clips adjusted, and the glass replaced to readjust the alignment.

As can be seen, there is a need for improved attachment brackets for mounting panels to walls.

SUMMARY OF THE INVENTION

In one aspect of the present invention, a wall mounting system comprises: a plurality of mount brackets each comprising; a top edge, a bottom edge and a height running from the bottom edge to the top edge; a first side edge, a second side edge and a length running from the first side edge to the second side edge; a front surface and a rear surface; and a pair of hooks extending along the length and substantially parallel to one another, wherein each of the pair of hooks comprises a horizontal portion and a vertical portion, wherein the horizontal portion comprises a proximal end and a distal end, wherein the proximal end extends from the front surface and comprises a notch formed on an upper surface, wherein the vertical portion extends from the distal end of the horizontal portion, wherein the plurality of mount brackets comprises at least one wall mount bracket and at least one panel mount bracket, wherein the pair of hooks of the at least one panel mount bracket interlock with the pair of hooks of the at least one wall mount bracket when the height of the at least one panel mount bracket is disposed in an upside-down position relative to the wall mount bracket.

In another aspect of the present invention, a method of mounting a panel to a wall comprises the steps of: providing a wall mount bracket and a panel mount bracket, wherein each of the wall mount bracket and the panel mount bracket comprise a pair of hooks substantially parallel to one another, wherein each of the pair of hooks comprises a horizontal portion and a vertical portion, wherein the horizontal portion comprises a proximal end and a distal end, wherein the proximal end extends from a front surface and comprises a notch formed on an upper surface, wherein the vertical portion extends from the distal end of the horizontal portion; fastening a rear surface of the wall mount bracket to a wall; fastening a rear surface of the panel mount bracket to a panel; and interlocking the pair of hooks of the wall mount bracket with the pair of hooks of the panel mount bracket.

These and other features, aspects and advantages of the present invention will become better understood with reference to the following drawings, description and claims.

BRIEF DESCRIPTION OF THE DRAWINGS

FIG. 2 is a perspective view of an embodiment of the present invention;
FIG. 3 is a perspective view of an embodiment of the present invention;
FIG. 4 is a perspective view of an embodiment of the present invention;
FIG. 8 is an exploded view of an embodiment of the present invention;
FIG. 9 is a perspective view of an embodiment of the present invention.

DETAILED DESCRIPTION OF THE INVENTION

Figure 1:
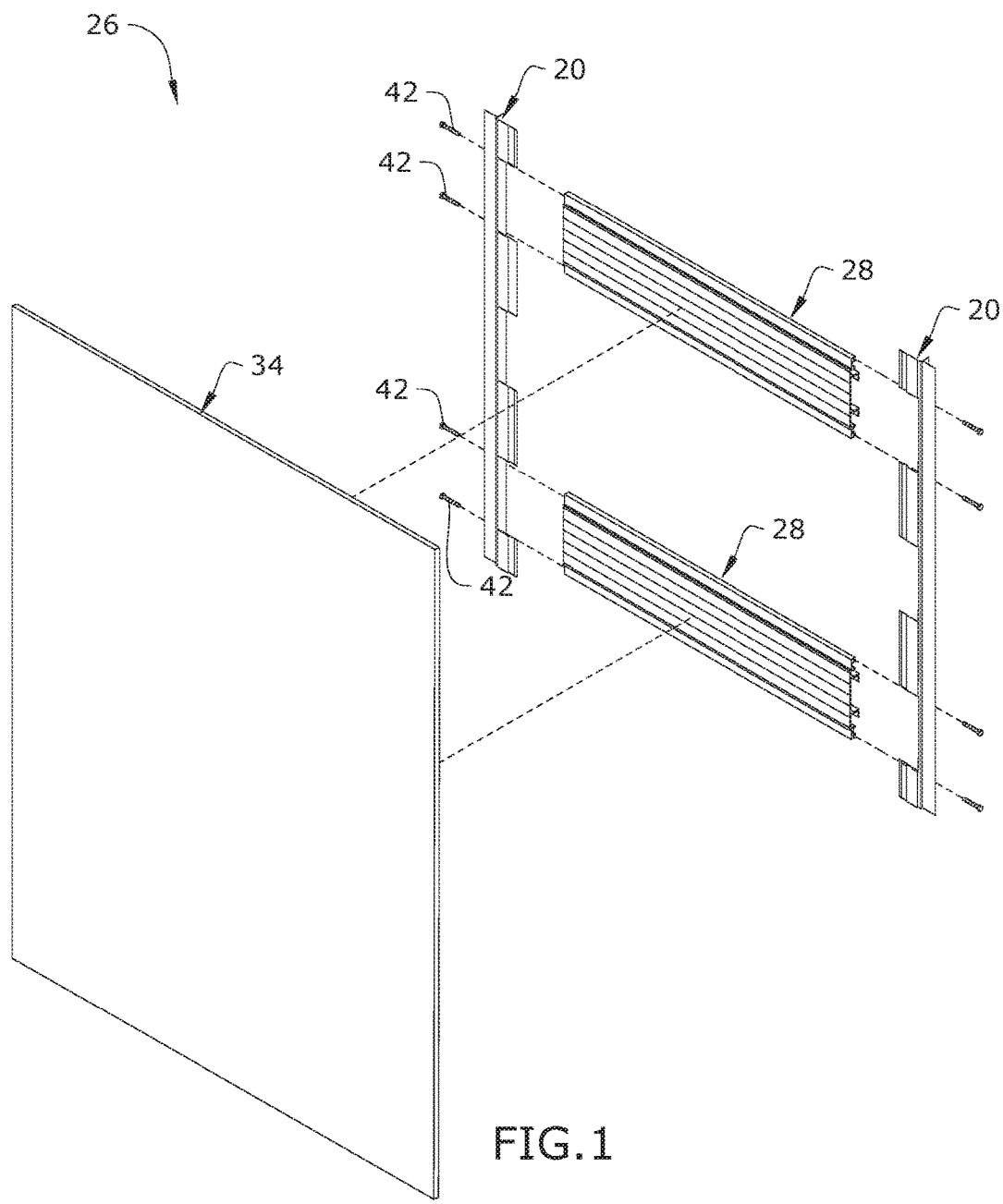
FIG. 1 is an exploded view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a means for vertically mounting decorative glass panels. The present invention enables glaziers to mount glass to walls from the front and align glass before physically attaching to the wall in a permanent fashion assuring alignment of each subsequent piece of glass and maintaining parallelism. The mounting system allows each piece of glass to cover mounting attachment points leaving no exposed mounting mechanism. Further, the panels are interchangeable as the glass is not permanently attached to the walls but simply hooked into place utilizing the mounting system.

The mounting system of the present invention allows glass to be mounted quickly, safely, and economically in an aligned fashion with minimum effort. The system improves on the safety of the finished product as the glass is factory adhered to the metal backing attachment plate offering increased shear performance. The system sets spacing between each subsequent row of glass, requiring minimal to no field adjustment. The glass only needs to be handled once reducing the likelihood of damage.

The present invention includes a mounting bracket adhered on a back of a panel. The mounting bracket includes hooks facing downward. A second mounting bracket may be screw-fastened to a wall with hooks facing upwards. Glass can be placed against the wall in final position and finely aligned before being permanently anchored. The glass mount and the wall mount brackets interlock to form a straight structural tube. The glass hangs on the wall increasing system rigidity with the glass mounts being parallel to the wall attachment. In certain embodiments, only one mounting bracket may be used in the case of a single glass panel being mounted on the wall. The forced parallelism of the double hook tube prevents prying or peeling of the mount from the glass panel, ensuring that force remains shear and even. The design allows two mounting brackets to provide the same support as 5 clips without twisting force, without the possibility of metal to glass contact, and while remaining fully adjustable after the glass is in place. The hooks are prevented from coming in contact with the glass by the shape of the glass mounting bracket and receiver. The receiving hooks are captured by the mounting hook and wedged between the hook and metal structure without the possibility of direct glass contact. The wall mount may be mounted directly to a stud with no need for a wall board as it may provide wall stiffening properties.

Decorative glass may be adhered to a first metal mounting bracket. The mounting bracket may be parallel to the edge of glass at a distance to create a standard reveal. The decorative glass is adhered using a structural architectural adhesive material or adhesive tape to the bracket such that the hooks are facing downward. The mounting brackets may be mounted to the top and bottom edge of the glass and offset back by a small amount, typically about 0-¼". A second mounting bracket is mounted with hole side up placing receiving hooks facing up (in reverse fashion to glass mount) on the wall at stud locations utilizing a screw through the 30 degree angled slots or the upright slots for initial attachment and allowing for slight adjustment after glass is placed in position. Final attachment is made with a screw through the top holes and into the stud.

Each piece of glass is secured to the mounting brackets in such a fashion that it may be mounted to a wall by simply hooking the mounting brackets together. The glass is positioned in final position onto the mounting brackets secured to the wall at top edge. Screws are driven through the mounting holes in the mounting bracket at the top and right of the glass directly into the wall stud creating permanent fixture to the wall.

Figure 5:
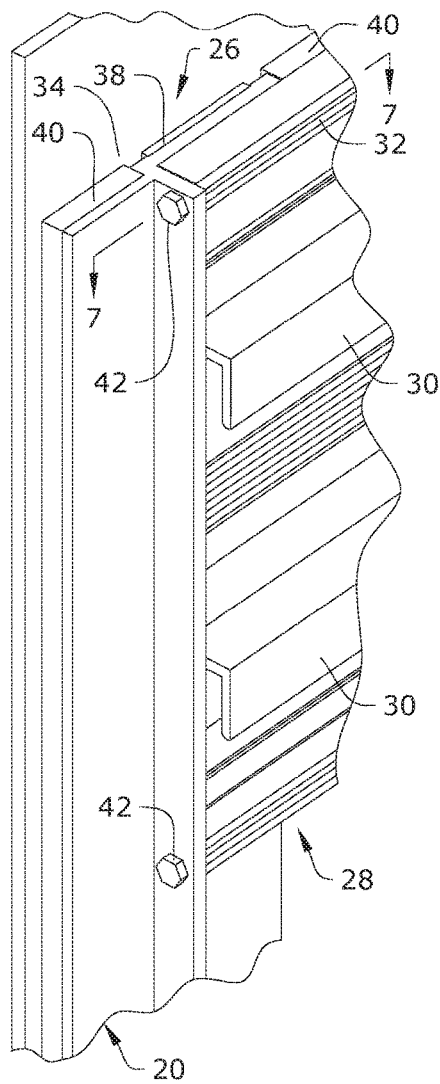
FIG. 5 is a detail perspective view of an embodiment of the present invention.
Figure 6:
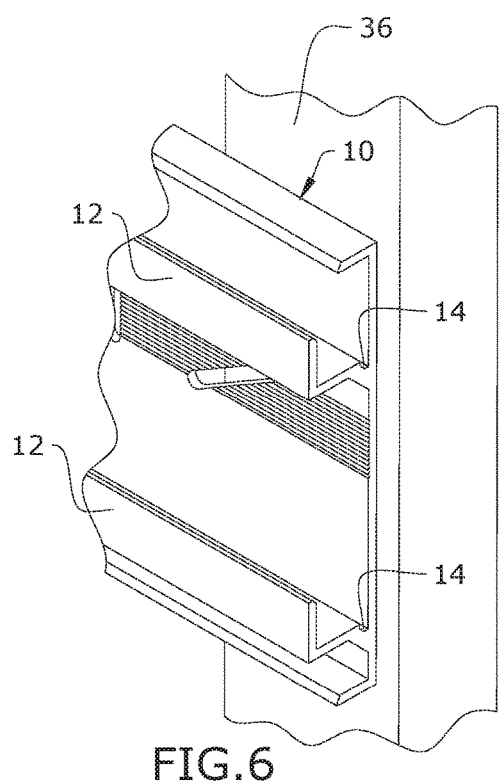
FIG. 6 is a detail perspective view of an embodiment of the present invention.
Figure 7:
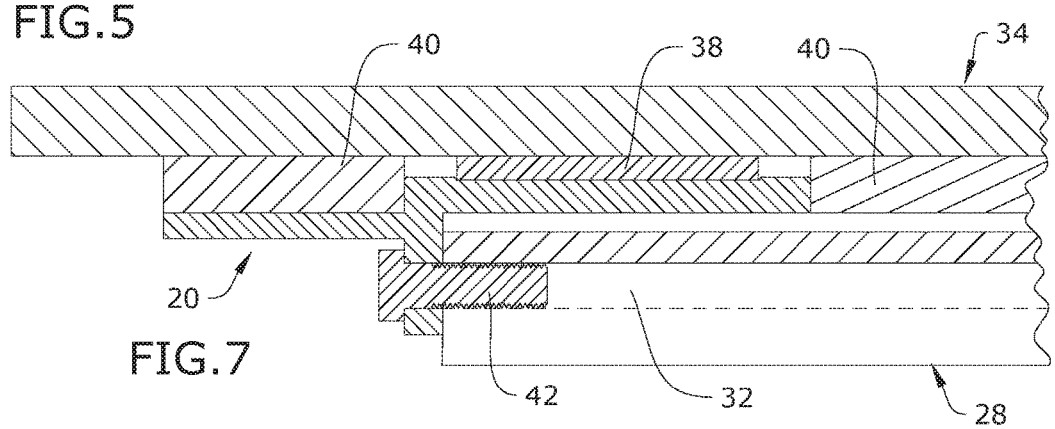
FIG. 7 is a section view of the present invention taken along line 7-7 in FIG. 5.
Figure 10:
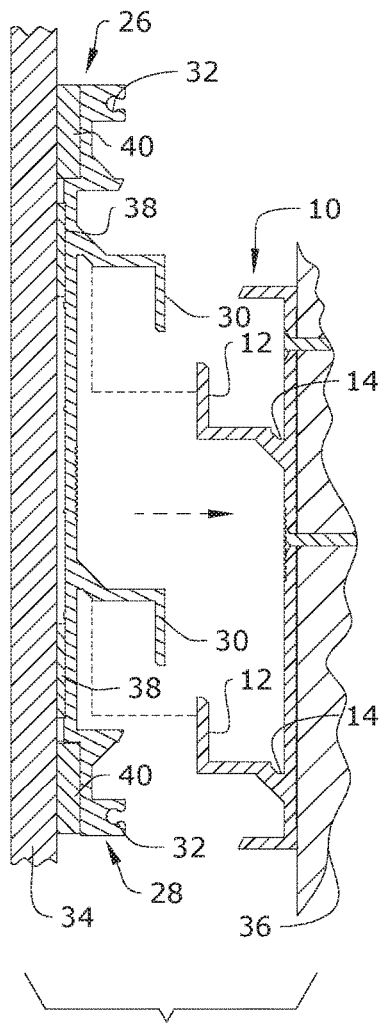
FIG. 10 is a section detail view of the present invention taken along line 10-10 in FIG. 8.
Figure 11:
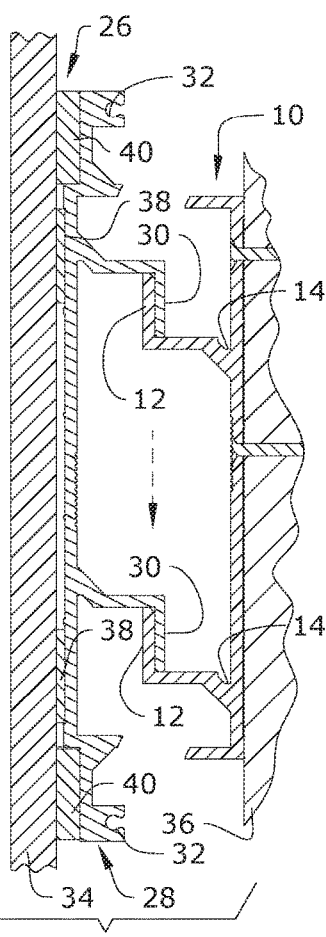
FIG. 11 is a section detail view of the present invention.
Figure 12:
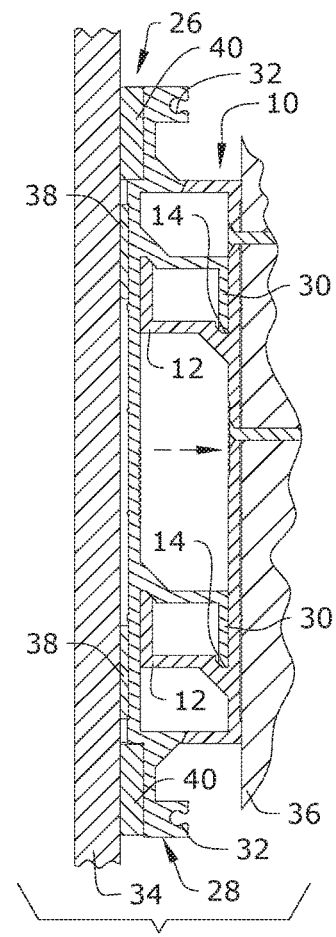
FIG. 12 is a section detail view of the present invention taken along line 12-12 in FIG. 9.
Figure 13:
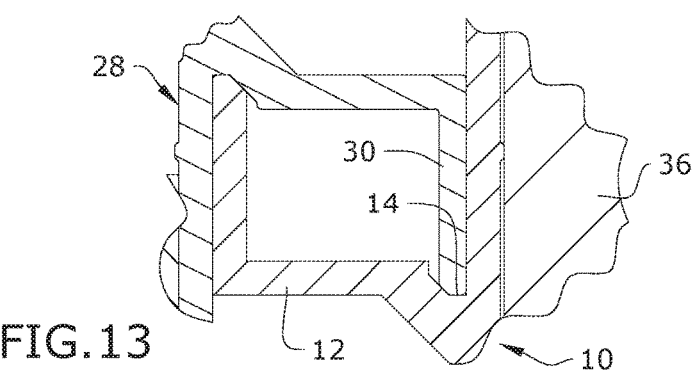
FIG. 13 is a section detail view of the present invention.
Figure 14:
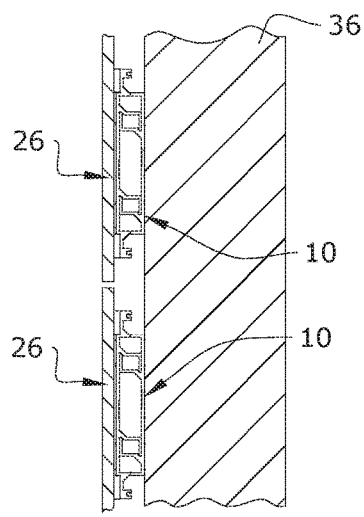
FIG. 14 is a section detail view of the present invention.
Figure 15:
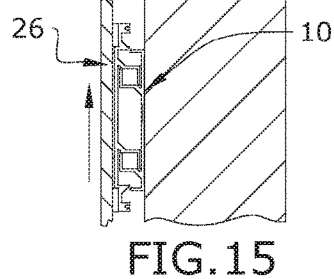
FIG. 15 is a section detail view of the present invention.
Figure 16:
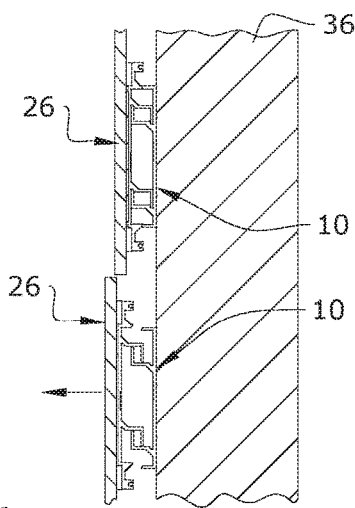
FIG. 16 is a section detail view of the present invention.
Figure 17:
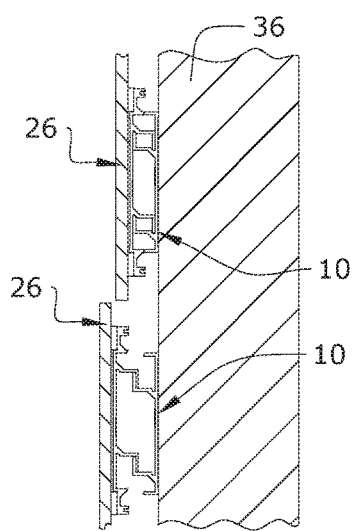
FIG. 17 is a section detail view of the present invention.
Figure 18:
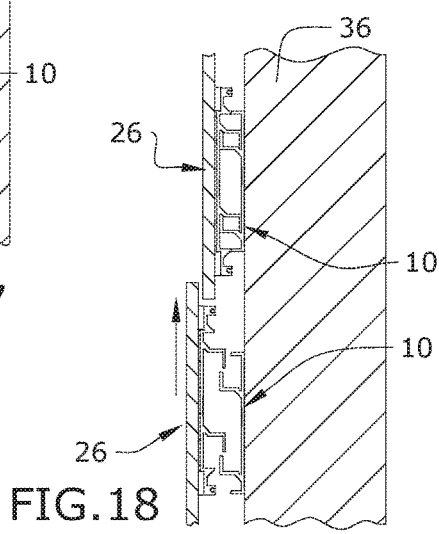
FIG. 18 is a section detail view of the present invention.
Figure 19:
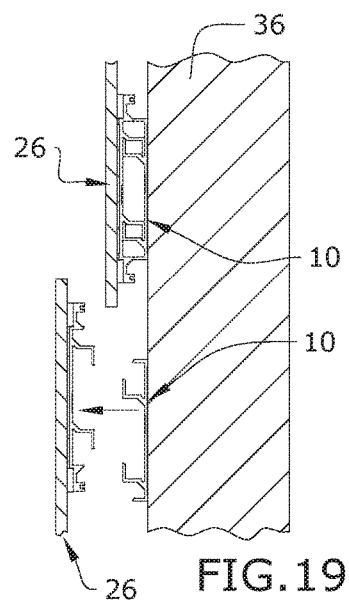
FIG. 19 is a section detail view of the present invention.

Referring to FIGS. 1 through 19, the present invention includes a wall mounting system. The wall mounting system includes a plurality of mount brackets 10, 28. Each of the mount brackets 10, 28 include a top edge, a bottom edge and a height running from the bottom edge to the top edge. The mount brackets 10, 28 further includes a first side edge, a second side edge and a length running from the first side edge to the second side edge. The mount brackets 10, 28 further includes a front surface and a rear surface. A pair of hooks 12, 30 extend along the length and are substantially parallel to one another. Each the pair of hooks 12, 30 includes a horizontal portion and a vertical portion. The horizontal portion includes a proximal end and a distal end. The proximal end extends from the front surface and includes a notch 14 formed on an upper surface. The vertical portion extends from the distal end of the horizontal portion.

The plurality of mount brackets 10, 28 include at least one wall mount bracket 10 and at least one panel mount bracket 28. The wall mount bracket 10 is secured to the studs 36 of a wall by bolts 42 running through corresponding apertures 18 formed through the wall mount bracket 10. A panel 34, such as a glass panel, is adhered to the panel mount brackets 28 by an adhesive layer 38, 40. The vertical portion of the pair of hooks 30 of the panel mount bracket 28 may be extending upwards while the vertical portion of the pair of hooks 12 of the wall mount bracket 10 may be extending downwards. The pair of hooks 30 of the panel mount bracket 28 interlock with the pair of hooks 12 of the wall mount bracket 10, thereby securing the panel 34 to the wall.

The horizontal portions of each of the pair of hooks 12, 30 are perpendicular to the front surface and the vertical portions of each of the pair of hooks 12, 30 are parallel to the front surface. When interlocking the pair of hooks 30 of the panel mount bracket 28 with the pair of hooks 12 of the wall mount bracket 10, the vertical portions are lifted over each other. The vertical portions are then lowered so that they are adjacent to one another and the distal ends of the vertical portions are resting against the horizontal portions. The panel mount bracket 28 is then pushed towards the wall mount bracket 10 until the distal ends of the vertical portions are nested within the notches 14. When the distal ends of the vertical portions are nested within the notches 14, the panel mount bracket 28 and the wall mount bracket 10 are locked together in a fixed position.

In certain embodiments, the wall mount bracket 10 includes a plurality of elongated slots 16. The elongated slots 16 may be disposed in between the pair of hooks 12. The elongated slots 16 may include a plurality of vertical slots and a plurality of angled slots relative to the height. The elongated slots 16 allow the glazier to adjust the wall mount bracket 10 prior to fixing the wall mount bracket 10 to the walls. For example, a bolt 42 may be driven through one of the elongated slots and into the stud 36. The panel mount bracket 38 may be attached to the wall mount bracket 10 that is attached to the wall. If adjustment is needed, the wall mount bracket 10 attached to the wall may be moved up and down as well as side to side along the elongated slots 16 for alignment. Once aligned, bolts 42 may be driven through the apertures 18 and into the studs 36.

In certain embodiments, a plurality of screw alignment ridges 44 may be formed along the length of the body of the wall mount bracket 10. The elongated slots 16 may be formed through the screw alignment ridges 44. In such embodiments, the present invention may utilize countersunk washers. The fasteners 42 may run through the countersunk washers, one of the plurality of elongated slots 16 and into the stud 36. The countersunk washers may be pressed in between the screw alignment ridges 44, thereby preventing the fasteners 42 from shifting within the elongated slots 16.

The present invention may further include a panel assembly 26. The panel assembly 26 includes a pair of side rails 20. An upper panel mount bracket 28 and a lower panel mount bracket 28 may be secured to the pair of side rails 20 by bolts 42 running through apertures 22 and into slots 32 of the panel mount brackets 28. Each of the pair of side rails 20 may include an outer flange 24 and an inner flange 24. A primary adhesive layer 38 may be secured to the inner flange 24 and a secondary adhesive layer 40 may be secured to the outer flange 24. The panel 34 is then adhered to both the primary adhesive layer 38 and the secondary adhesive layer 40 of each of the inner and outer flanges 24 of the pair of side rails 20 forming the panel assembly 26. Thereby, two panel mount brackets 28 may be secured to a rear surface of a single panel 34.

A method of mounting a panel to a wall may include the following steps: providing a wall mount bracket and a panel mount bracket, wherein each of the wall mount bracket and the panel mount bracket include a pair of hooks substantially parallel to one another, wherein each of the pair of hooks include a horizontal portion and a vertical portion, wherein the horizontal portion includes a proximal end and a distal end, wherein the proximal end extends from a front surface of the mount brackets and includes a notch formed on an upper surface, wherein the vertical portion extends from the distal end of the horizontal portion; fastening a rear surface of the wall mount bracket to a wall; fastening a rear surface of the panel mount bracket to a panel; and interlocking the pair of hooks of the wall mount bracket with the pair of hooks of the panel mount bracket.

The step of fastening the rear surface of the wall mount bracket to the wall may include the step of driving a plurality of bolts through corresponding apertures formed through the wall mount bracket and into the wall. The step of fastening the rear surface of the panel mount bracket to the panel may include the step of adhering the panel to the rear surface of the panel mount bracket.

As mentioned above, the wall mount bracket may include a plurality of elongated slots formed in between the pair of hooks. The plurality of elongated slots include a plurality of vertical slots and a plurality of angled slots. The step of fastening the rear surface of the wall mount bracket to the wall may include the steps of: driving at least one bolt through at least one of the at least one vertical slot and the at least one angled slot and into the wall; adjusting the wall mount bracket by moving the wall mount bracket relative to the at least one bolt disposed within one of the at least one vertical slot and the at least one angled slot; and fixing the rear surface of the wall mount bracket to the wall by driving a plurality of bolts through corresponding apertures formed through the wall mount bracket and into the wall.

As mentioned above, the horizontal portions of each of the pair of hooks are perpendicular to the front surface and the vertical portions of each of the pair of hooks are parallel to the front surface. The step of interlocking the hooks may include lifting the vertical portions over one another; lowering the vertical portions so that the vertical portions are adjacent to one another and the distal ends of the vertical portions are resting against the horizontal portions; pushing the panel mount bracket towards the wall mount bracket until the distal ends of the vertical portions are nested within the notches.

It should be understood, of course, that the foregoing relates to exemplary embodiments of the invention and that modifications may be made without departing from the spirit and scope of the invention as set forth in the following claims.

What is claimed is:

1. A wall mounting system comprising:
    a plurality of mount brackets each comprising;
        a top edge, a bottom edge and a height running from the bottom edge to the top edge;
        a first side edge, a second side edge and a length running from the first side edge to the second side edge;
        a front surface and a rear surface; and
        a pair of hooks extending along the length and substantially parallel to one another, wherein each of the pair of hooks comprises a horizontal portion and a vertical portion, wherein the horizontal portion comprises a proximal end and a distal end, wherein the proximal end extends from the front surface and comprises a notch formed on a horizontal surface, wherein the vertical portion extends from the distal end of the horizontal portion, wherein
    the plurality of mount brackets comprises at least one wall mount bracket and at least one panel mount bracket, and
    the pair of hooks of the at least one panel mount bracket interlock with the pair of hooks of the at least one wall mount bracket by resting the distal ends of the vertical portions against the horizontal surfaces of the horizontal portions and sliding the distal ends of the vertical portions along the horizontal portions into the notches.

2. The wall mounting system of claim 1, wherein the horizontal portions of each of the pair of hooks are perpendicular to the front surface and the vertical portions of each of the pair of hooks are parallel to the front surface.

3. The wall mounting system of claim 1, wherein the at least one wall mount bracket comprises a plurality of apertures formed therethrough, and a plurality of bolts each sized to fit within a corresponding aperture of the plurality of apertures.

4. The wall mounting system of claim 1, wherein the at least one wall mount bracket comprises a plurality of elongated slots disposed in between the pair of hooks.

5. The wall mounting system of claim 4, wherein the plurality of elongated slots comprises a plurality of vertical slots and a plurality of angled slots relative to the height.

6. The wall mounting system of claim 4, wherein the at least one wall mount bracket comprises a plurality of ridges running along the length of the front surface, wherein the plurality of elongated slots are formed through the ridges.

7. The wall mounting system of claim 1, wherein the at least one panel mount bracket comprises an adhesive disposed on the rear surface.

8. A method of mounting a panel to a wall comprising the steps of:
    providing a wall mount bracket and a panel mount bracket, wherein each of the wall mount bracket and the panel mount bracket comprise a pair of hooks substantially parallel to one another, wherein each of the pair of hooks comprises a horizontal portion and a vertical portion, wherein the horizontal portion comprises a proximal end and a distal end, wherein the proximal end extends from a front surface of the mount brackets and the proximal end comprises a notch formed on a horizontal surface of the horizontal portion, wherein the vertical portion extends from the distal end of the horizontal portion;
    fastening a rear surface of the wall mount bracket to a wall;
    fastening a rear surface of the panel mount bracket to a panel; and interlocking the pair of hooks of the wall mount bracket with the pair of hooks of the panel mount bracket by resting the distal ends of the vertical portions against the horizontal surfaces of the horizontal portions and sliding the distal ends of the vertical portions along the horizontal portions into the notches.

9. The method of claim 8, wherein the step of fastening the rear surface of the wall mount bracket to the wall comprises the step of driving a plurality of bolts through corresponding apertures formed through the wall mount bracket and into the wall.

10. The method of claim 8, wherein the step of fastening the rear surface of the panel mount bracket to the panel comprises the step of adhering the panel to the rear surface of the panel mount bracket.

11. The method of claim 8, wherein the wall mount bracket comprises a plurality of elongated slots formed in between the pair of hooks.

12. The method of claim 11, wherein the plurality of elongated slots comprises a plurality of vertical slots and a plurality of angled slots relative.

13. The method of claim 12, wherein the step of fastening the rear surface of the wall mount bracket to the wall comprises the steps of:
   driving at least one bolt through at least one of the at least one vertical slot and the at least one angled slot and into the wall;
   adjusting the wall mount bracket by moving the wall mount bracket relative to the at least one bolt disposed within one of the at least one vertical slot and the at least one angled slot; and
   fixing the rear surface of the wall mount bracket to the wall by driving a plurality of bolts through corresponding apertures formed through the wall mount bracket and into the wall.

* * * * *